(12) United States Patent
Groth et al.

(10) Patent No.: US 8,994,532 B2
(45) Date of Patent: *Mar. 31, 2015

(54) DATA CENTER EQUIPMENT LOCATION AND MONITORING SYSTEM

(71) Applicant: Attend Systems, LLC, Novato, CA (US)

(72) Inventors: Noah Groth, San Rafael, CA (US); Jan P. Warhuus, El Cerrito, CA (US); Krassimir Anastassov Boyadjiev, Novato, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,572

(22) Filed: Jul. 15, 2014

(65) Prior Publication Data

US 2014/0320288 A1    Oct. 30, 2014

Related U.S. Application Data

(63) Continuation of application No. 13/571,744, filed on Aug. 10, 2012, now Pat. No. 8,779,922, which is a continuation of application No. 12/579,257, filed on Oct. 14, 2009, now Pat. No. 8,264,354.

(51) Int. Cl.
| | | |
|---|---|---|
| *G08B 13/12* | (2006.01) | |
| *G08B 3/10* | (2006.01) | |
| G06Q 10/08 | (2012.01) | |
| *H04L 12/24* | (2006.01) | |

(Continued)

(52) U.S. Cl.
CPC ............ *G08B 3/1083* (2013.01); *G06Q 10/087* (2013.01); *H04L 41/12* (2013.01); *H04L 43/0817* (2013.01); *H04L 12/14* (2013.01); *H04L 12/1446* (2013.01); *H04L 65/1016* (2013.01); *H04L 65/1083* (2013.01); *H04M 15/00* (2013.01); *H04M 15/49* (2013.01); *H04M 15/55* (2013.01); *H04M 15/65* (2013.01); *H04M 15/82* (2013.01); *H04M 15/8228* (2013.01);

(Continued)

(58) Field of Classification Search
None
See application file for complete search history.

(56) References Cited

U.S. PATENT DOCUMENTS

| | | | | |
|---|---|---|---|---|
| 5,434,775 | A | * | 7/1995 | Sims et al. ................. 705/7.12 |
| 6,762,691 | B2 | * | 7/2004 | Piazza ........................... 340/8.1 |

(Continued)

*Primary Examiner* — Eric M Blount
(74) *Attorney, Agent, or Firm* — D. Benjamin Borson; Borson Law Group, PC

(57) ABSTRACT

A data center equipment location system includes both hardware and software to provide for location, monitoring, security and identification of servers and other equipment in equipment racks. The system provides a wired alternative to the wireless RFID tag system by using electronic ID tags connected to each piece of equipment, each electronic ID tag connected directly by wires to a equipment rack controller on the equipment rack. The equipment rack controllers then link over a local area network to a central control computer. The central control computer provides an operator interface, and runs a software application program that communicates with the equipment rack controllers. The software application program of the central control computer stores IDs of the equipment rack controllers and each of its connected electronic ID tags in a database. The software application program in operation receives information from the electronic ID tags in real time enabling the central control computer to monitor the status, such as temperature and movement or tampering of each piece of equipment through its connected electronic ID tag. Further, the software application program can send a signal to an individual electronic ID tag to activate a sensory indicator to enable a technician(s) to locate a piece of equipment that is in need of repair or replacement.

9 Claims, 3 Drawing Sheets

(51) Int. Cl.
*H04L 12/26* (2006.01)
*H04L 12/14* (2006.01)
*H04L 29/06* (2006.01)
*H04M 15/00* (2006.01)
*H04W 4/24* (2009.01)
*G08B 21/18* (2006.01)
*H04L 12/12* (2006.01)

(52) U.S. Cl.
CPC ............... *H04W 4/24* (2013.01); *G08B 21/182* (2013.01); *H04L 12/12* (2013.01)
USPC .................. 340/568.2; 340/572.1; 340/539.1; 709/223; 705/28

(56) References Cited

U.S. PATENT DOCUMENTS

| | | | | |
|---|---|---|---|---|
| 6,796,506 | B1 * | 9/2004 | Pradhan et al. | 235/462.13 |
| 7,792,943 | B2 * | 9/2010 | Chainer et al. | 709/223 |
| 7,952,485 | B2 * | 5/2011 | Schechter et al. | 340/584 |
| 2002/0095487 | A1 * | 7/2002 | Day et al. | 709/223 |
| 2003/0046339 | A1 * | 3/2003 | Ip | 709/203 |
| 2004/0178269 | A1 * | 9/2004 | Pradhan et al. | 235/462.13 |
| 2006/0171538 | A1 * | 8/2006 | Larson et al. | 380/270 |
| 2009/0282140 | A1 * | 11/2009 | White et al. | 709/223 |

* cited by examiner

DATA CENTER EQUIPMENT LOCATION AND MONITORING SYSTEM

CLAIM OF PRIORITY

This Continuation application claims priority to U.S. Utility application Ser. No. 13/571,744 entitled "Data Center Server Location and Monitoring System," Noah Groth, Jan P. Warhuus and Krassimir A. Boyadjiev, inventors, filed Aug. 10, 2012, now U.S. Pat. No. 8,779,922, issued Jul. 15, 2014, which is a continuation of U.S. application Ser. No. 12/579,257, filed Oct. 14, 2009, Noah Groth, Jan P. Warhuus and Krassimir A. Boyadjiev, inventors, now U.S. Pat. No. 8,264,354 issued Sep. 11, 2012. These applications and patents are herein incorporated fully by reference.

BACKGROUND

1. Technical Field

The present invention relates to a system for information technology (IT) asset location, monitoring, identification, and security. More particularly, the present invention relates to a system for location and identification of equipment in data center equipment racks, and for providing monitoring and security for the equipment.

2. Related Art

A data center is generally located in a high-tech building that is designed to run and operate large numbers of servers, computers and communication equipment. Data Centers are an essential element in the Internet and IT infrastructure of large organizations. There are thousands of data centers around the world, and an important component of any data center are the equipment racks that house the data center equipment, including servers, computers and communication equipment. A typical equipment rack can hold 40 to 50 standard sized servers or other pieces of equipment. FIG. 1 shows such an equipment rack (ER) 150 that carries a number of pieces of equipment rack equipment (ERE) 108. A large data center can have thousands of these ER 150s containing many thousands of servers and other ERE 108, each of which cost several thousand dollars on average and may contain highly confidential or proprietary data. The data center's management must be able to locate, identify and secure their equipment in order to meet their operational, financial and regulatory compliance requirements.

Conventionally, in order to count and locate equipment, data center managers use one of the three options that are described to follow. In each case, a unique IDentification (ID) tag is associated with each piece of equipment to be tracked, and this information is recorded in some way into an inventory database.

A. Manual Option

For the manual option, a person must periodically visit each equipment rack and record its location and the asset ID for each piece of equipment in the equipment rack. This information may be captured by someone's memory, by hand on a clipboard, or in a spreadsheet-type electronic table. For example, in order to uniquely identify equipment that serves a specific function among otherwise physically similar or identical equipment, the data center will typically print a paper label with a human readable asset ID and then affix this paper label to the server or equipment. The human readable paper label becomes the unique identifier that is used to identify the equipment. This approach is error prone, very labor intensive and risky for two reasons. First, the labels tend to fall off, and labels degrade over time. Additionally, the nature of the human interaction involved in creating, printing and affixing asset IDs can lead to some level of naming conflicts whereby the human readable names may be easily duplicated, mislabeled, misread, mis-affixed, and/or misidentified. Second, asset ID labels can identify a piece of equipment only if a technician can actually physically locate the piece of equipment. In order to locate the equipment, it is necessary to keep track of where a piece of equipment with a certain asset ID label is located. Typically, the data center will use some kind of inventory records and try to keep these records up to date. However, tracking and keeping current inventory records for equipment that is added, moved, and/or replaced on a continuous basis is very labor intensive and error prone. With this option, there is a serious risk that the technician will work on, reconfigure, move or replace the wrong piece of equipment and cause significant, additional problems.

The manual process may be enhanced by placing barcodes on the asset ID labels and using portable barcode readers to read the asset ID off the barcode. Later, the collected information is saved from the barcode reader into an electronic database. If the location is recorded as well, then the electronic database can be accessed to provide location information about the equipment at the time the barcode was read. With barcodes, it is easier to avoid the naming conflicts mentioned above because labels are machine read and the level of human interaction is one step removed from these activities. However, the other manual process issues remain and the problems with this barcode version of the manual option is that it is labor intensive, error prone, time consuming, costly to implement, requires specialized equipment, and the data collected represents only a single point in time. Because the barcode data reads represent a single point in time, from the moment the information is gathered, its accuracy is immediately degraded and out-of-date because data center operators move, repair and replace equipment regularly. Consequently, data centers typically have trouble keeping a manual database accurate and up to date.

B. Passive RFID Option

Passive RFID (Radio Frequency IDentification) tags have been used to track and identify IT assets for about a decade. Passive tags do not contain a power supply, but rely instead on harvesting power from a passive RFID reader in order to transmit a signal. With this option, passive RFID tags are placed on equipment in an equipment rack, and periodically, a person will visit each equipment rack and use a passive RFID reader to read the passive RFID tags on the equipment and record the location. Many vendors offer passive RFID tags and readers. Using a passive RFID tag reader is similar to using the Manual Option with a barcode reader; i.e., in both cases, a person operating the readers must be within close physical proximity and line of sight with the barcode or RFID tag. An RFID reader, however, offers advantages over a barcode reader as the RFID tag's radio wave can be read from odd angles, as compared to a barcode reader's infrared beam that has to be aligned with the line of bars of the barcode. Additionally, many RFID tags can be read from a distance of several feet, as compared to a read distance of only a few inches for a barcode tag. However, the passive RFID Option has many of the same drawbacks as the Manual Option: it is labor intensive, error prone and it represents single point-in-time information that erodes quickly and lacks accuracy as data center equipment is moved or replaced.

C. Active RFID Option

Active RFID tags have emerged as the next generation of RFID tags to track equipment, including IT equipment, and provide an improvement over passive RFID tags. The company "RF Code" is a vendor that currently offers an active RFID system used to track equipment in data centers. Active RFID tags have an on-board power supply, which gives them the ability to periodically transmit a radio signal to an RFID reader without being powered or prompted to do so by the reader. Powered by their on-board power supply, these tags are operating independent of an RFID reader or other receiving system. When used in production flows and storage facilities, for example container yards, readers are typically installed at entry and exit points of buildings and/or processes to be monitored, typically called "zones". In data centers, because of the environmental obstacles that metal equipment racks and metal server cabinets represent to radio-wave based communication and because of the need to define the "zone" as accurately as an equipment rack, an RFID antenna and reader is installed on each equipment rack in order to read the active tags placed on each piece of equipment in an equipment rack. Each RFID reader has a unique ID that is associated with a specific equipment rack in a specific location, and this information is saved to a software application database. The active RFID tags on the equipment will periodically transmit their unique ID, and this is received by the RFID antenna and transferred to the reader assigned to the equipment rack. The data received by the RFID reader is then sent to a software application that will associate the reader ID and the RFID tag ID with a location and a piece of equipment.

D. Comparison of Options

Active RFID has the advantage over the Passive RFID option in that it provides real-time location information about each piece of equipment in the equipment rack. However, active RFID tags, readers and antenna installation are very costly. Further, due to the high concentration of metal (in the equipment racks and equipment), signal interference problems result which can cause reduced reliability and stability in reading the active tag signals and complicated installation and maintenance procedures. Also, active RFID tags can only transmit signals and typically cannot receive signals, so their functionality is limited to broadcasting only.

Data centers are increasingly interested in moving away from the Manual Option and will often review the passive RFID Option and to a much lesser extent the active RFID Option. This is evidenced by the adoption of standards by the Financial Services Technology Consortium for passive RFID tags to be used on data center equipment. This standard is gaining momentum and acceptance in data centers in spite of the shortcomings of passive RFID. RFID options are inherently attractive as they provide a reduction in cost of inventory counts and equipment tracking, and, thus, are viewed as good alternatives to manual methods.

A drawback to all of the current options is the lack of ability to locate equipment even if it is identifiable by either a manual label or an RFID tag. People operating and monitoring the data center equipment are often not in the same physical location as the equipment racks. Consequently, when there is a problem with a piece of equipment, the data center operator will contact a technician who is located in the data center and have the technician go to the equipment rack and work on the problem equipment. The data center operator is looking on a computer screen that identifies the equipment on the electronic network, but this is not linked to a physical location of the equipment. Thus, when the technician arrives at the equipment rack, it is difficult for the technician to identify the specific piece of equipment within the equipment rack that is in need of attention because most often the equipment in the rack is the same or a similar model.

Data centers are further faced with issues of physical security of rack-mounted equipment in the equipment rack. If a data center operator is alerted that a piece of equipment is down, the operator has to undertake a diagnostic process to identify why. Has the power supply failed? Did someone unplug the network cable? Did the equipment overheat? Did someone remove the equipment from the rack? All such physical security related potential issues are complicated to determine and resolve. Therefore, the process of determining why the equipment failed is time consuming and can cause significant delays in getting the equipment back in operation.

SUMMARY

Embodiments of the present invention provide a data center monitoring system with an integrated system of electronic hardware and software that provides location, security, monitoring, and identification of rack equipment, in real time, to data center personnel.

The data center monitoring system provides a wired alternative to the wireless RFID tag systems. As noted above, the market acceptance and momentum of wireless RFID tags to provide data center monitoring is growing, but hindered by costs and signal interference problems. This momentum and acceptance has obscured and overshadowed other possible methods, such as use of the direct wire connection technology system of embodiments of the present invention to improve the location and monitoring of equipment in data center equipment racks.

The system of embodiments of the present invention includes electronic ID tags that are attached to each individual piece of equipment (such as a server) in the data center. An equipment rack controller further forms part of the system and is connected to each rack or group of closely spaced racks using wires to the electronic ID tags on the one or more equipment racks. The equipment rack controllers are then connected over a local area network to a central control computer to complete the system.

The central control computer provides an operator interface, and runs a software application program that communicates with the equipment rack controllers and electronic ID tags. The software application program on the central control computer stores the IDs of the equipment rack controllers as well as the electronic ID tags associated with the equipment rack controllers in a database on the central control computer. The software application program receives information from the electronic ID tags in real time, enabling the central control computer to monitor the status of each piece of equipment that has a connected electronic ID tag. Further, the software application program can send a signal to an individual electronic ID tag to activate a sensory indicator to enable a technician(s) to locate a specific piece of equipment that is in need of monitoring, repair or replacement.

The electronic ID tags include a processor, memory for storing data and control code to enable operation of the processor, and a power distribution network. Three wires form a data link cable that connects to each electronic ID tag, one wire for power, one for ground connection, and one for data signals. Also included onboard the electronic ID tag and controlled by its processor is a sensory indicator, a temperature monitor and a tamper detection device. The sensory indicator, such as an LED, enables a central control computer operator(s) to signify to a local technician(s) a specific piece of equipment attached to a specific electronic ID tag. The temperature monitor measures the ambient air temperature around the electronic ID tag. The tamper detection device provides an indication when the electronic ID tag has been detached from the equipment, or if the electronic ID tag is otherwise tampered with.

The wired data link cables connect the electronic ID tags on an equipment rack in series to the equipment rack controller. A separate data link cable is connected from the last electronic ID tag in a series back to the equipment rack controller so that if one electronic ID tag fails in the series, subsequent electronic ID tags are not cut off from the equipment rack controller. As indicated above, the data link cable includes three wires, one for power, one for ground connection, and one for data signals.

Using the system according to embodiments of the present invention, a solution is provided to the remote identification problem. With the sensory indicator included on an electronic ID tag, a data center operator can remotely indicate, for example through illumination, a specific electronic ID tag that is attached to the problem equipment and provide reliable identification, enabling the technician(s) to quickly and easily identify problem equipment.

Further, a data center operator(s) can immediately determine if someone has removed the equipment from the equipment rack and eliminate one possibility as to why the equipment is not functioning correctly. Embodiments of the present invention reliably determine if equipment is physically still in the equipment rack because, in order to remove equipment from the rack, the electronic ID tag must be disconnected from the wire connection. The built-in tamper detection device in the electronic ID tag alerts the central control computer operator(s) if anyone removes or attempts to remove the electronic ID tag from the equipment.

Another benefit of embodiments of the present invention is the detailed mapping of the ambient air temperature of multiple points within an equipment rack. Typically, temperature measurements in a data center are single points of measurements for a large area. When energy was cheap and carbon emissions were not an issue, single-point temperature measurement for a larger area was adequate. However, this approach does not identify hot or cold spots in the area being measured, resulting in energy inefficiencies. With the system of embodiments of the present invention, a multipoint temperature measurement can be made within each rack to enable a more efficient use of power.

BRIEF DESCRIPTION OF THE DRAWINGS

Further details of the present invention are explained with the help of the attached drawings in which.

DETAILED DESCRIPTION

I. Data Center Monitoring System

Figure 1:
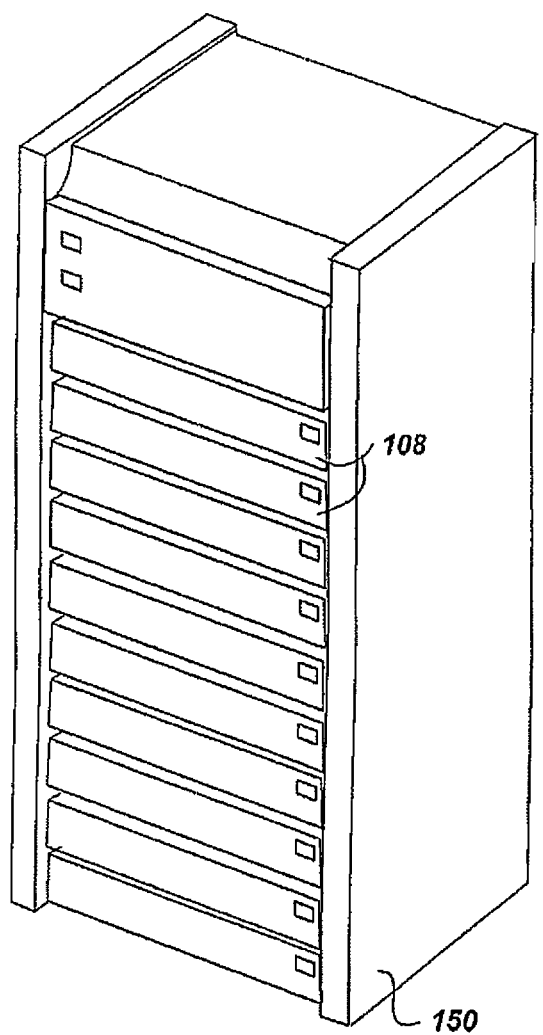
FIG. 1 illustrates an equipment rack containing multiple servers.
Figure 2:
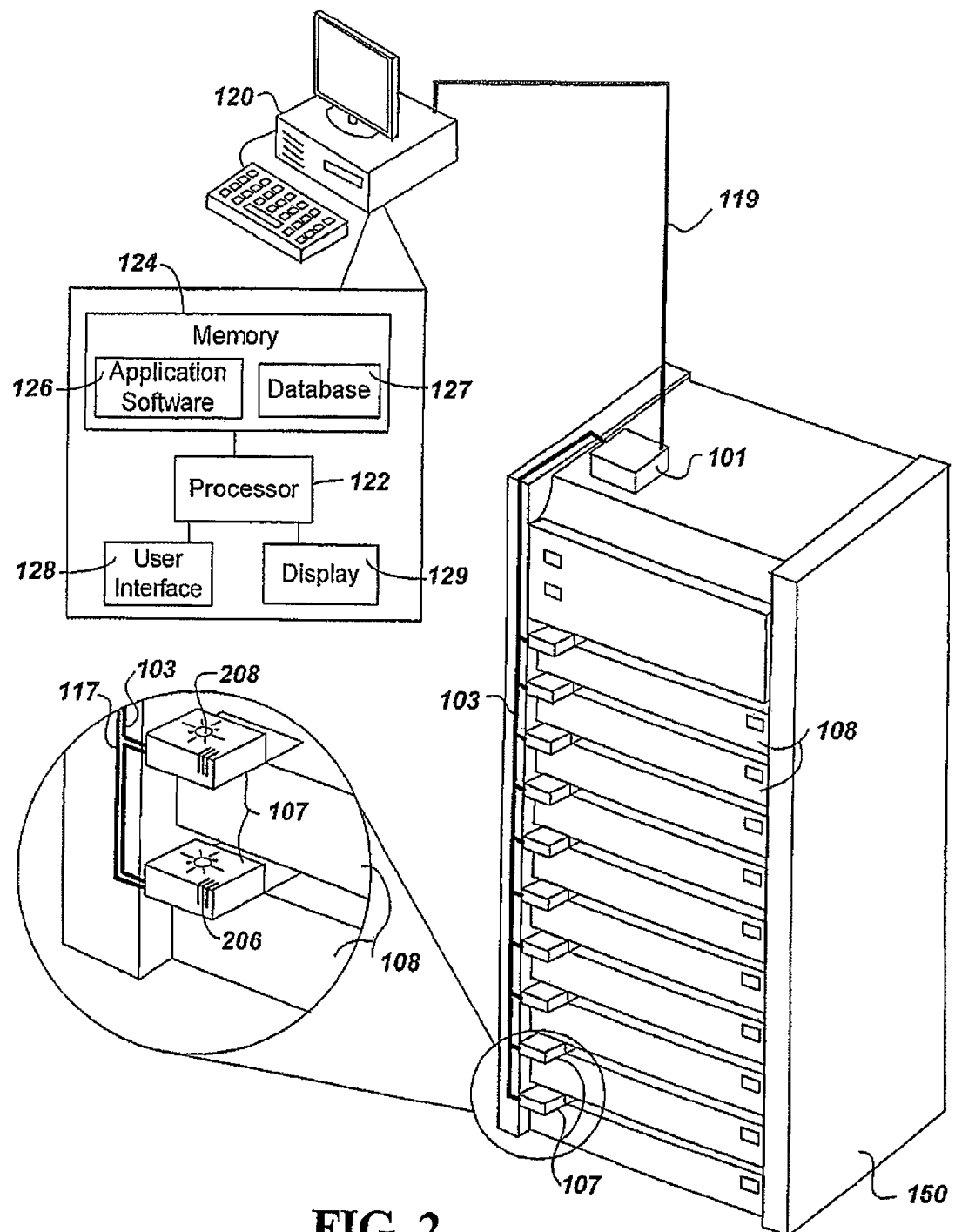
FIG. 2 illustrates components of a data center monitoring system according to embodiments of the present invention.

FIG. 2 shows components of a data center monitoring system according to embodiments of the present invention. The components shown include a single equipment rack (ER) 150 containing servers and/or other equipment rack equipment (ERE) 108. A single ER 150 is used for purposes of illustration only, as the system is intended for use with multiple ERs 150 typically found within a data center. The system further includes electronic ID tags (ET) 107, each being attached to an individual ERE 108. A communication and power data link cable (DL) 103 connects the ET 107s to an equipment rack controller (ERC) 101. The ERC 101 then provides a connection over a local area network 119 to a central control computer 120. The central control computer 120 contains a software application program 126 and database 127 to provide for monitoring, location and identification of each ET 107 in real time. Further, an ERC 101 can be attached to each ER 150 or to a group of closely located ER 150s, and each ERC 101 can communicate with the central control computer 120 in a similar fashion described with respect to ERC 101.

In the system shown, the ER 150 has a unique ID (ER ID) that designates its physical location in the data center. The ER ID is similar to a street address. Further, each ERE 108 that is housed in the ER 150 has a unique ID (ERE ID). Typically, there are many ERE 108s in each ER 150. During set-up of the software application program 126 in the central control computer 120, the ER IDs as well as the ERE IDs are entered into the database 127. More details of each of the components making up the system illustrated by FIG. 2 follow.

A. Electronic ID Tag (ET)

The ET 107 is a small electronic device that can receive signals from and send signals to the ERC 101. Each ET 107 has a permanent and unique electronic ID, a sensory indicator (SI) 208, a temperature monitor 206, and a tamper detection device (not shown in FIG. 2). During installation, the ET 107 is physically attached to an ERE 108 in the ER 150, and a software application program 126 running on the central control computer 120 is used to assign the unique ID of the ET 107 to a specific ERE 108 and saves this information in a database 127 residing on the central control computer 120, the database 127 being operated by the software application program 126 also provided in central control computer 120. The ERC 101 continually monitors and reports to the software application program 126 of central control computer 120 on the status of the ET 107s. The software application program 126 provided in the central control computer 120 uses this information along with the ERC 101, ER 150, and ET 107 ID information to report on the location and provide information on the temperature and security status of each ERE 108 in the ER 150.

Figure 3:
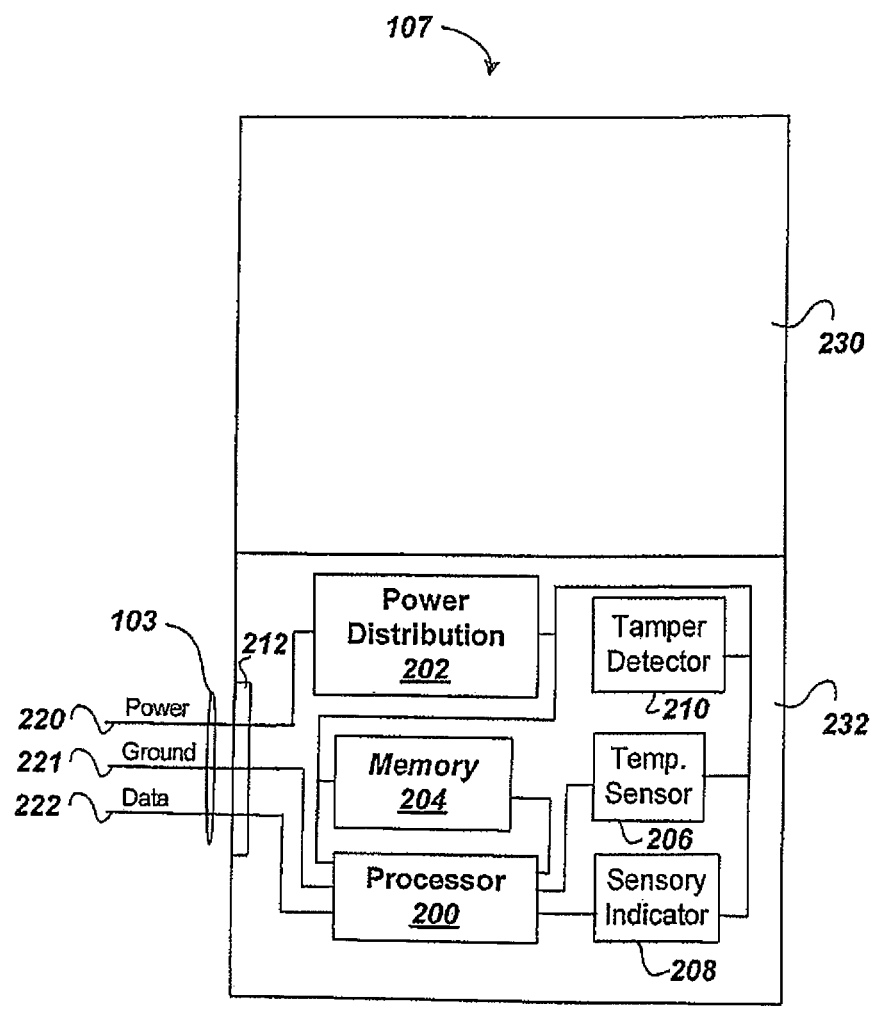
FIG. 3 is a block diagram showing details of the components of an electronic tag.

More details of the ET 107 can be seen with reference to the block diagram of components of an ET shown in FIG. 3. As shown, an ET 107 includes a data link line connector 212 that connects to three transmission line wires forming the DL 103. A power line 220 provides power to a power distribution device 202. The second is ground connection 221 and the third is the data line 222 that provides upstream and downstream data communications and links to the processor 200.

The processor 200 is connected to a memory device 204 for the purpose of storing code to operate the processor 200, as well as storing data. The processor 200 is also connected to a temperature monitor 206, an SI 208, and a tamper detection device 210. The temperature monitor 206 provides an ambient air temperature measurement for the air immediately surrounding the ET 107. The air temperature measured can be air provided to either the input or output of the cooling fans on the ERE 108. This allows monitoring the state of the ERE 108 cooling system, as well as control of air conditioning equipment surrounding individual areas of the ER 150 to maintain desired input or output air temperatures. The SI 208 can be activated using central control computer 120 to enable a technician(s) to locate a particular ERE 108. The tamper detection device 210 can be a device that detects motion or monitors the integrity of the ET 107 to prevent unauthorized detachment of the ET 107 from ERE 108. The tamper detection device 210 alternatively can be connected to attachment portion 230 to directly detect detachment of the ET 107 in order to alert a data center operator(s) when the ET 107 is disconnected.

The power distribution device 202 of the ET 107 provides power to the processor 200, memory device 204, temperature monitor 206, SI 208, and tamper detection device 210. The components 200, 202, 204, 206, 208 and 210 can be combined onto a single integrated circuit chip, or they can be separate components attached to a chip carrier 232 portion of the ET 107. An attachment portion 230 of the ET 107 provides a surface for attaching the ET 107 to an ERE 108. The processor 200 can be a microprocessor, a digital signal processor, a Field Programmable Gate Array (FPGA) or other device configured to perform the process steps described herein.

B. Data Link (DL)

The DL 103 is a serial/daisy chain of physical cables that connect the ERC 101 to the ETs 107 under its control. The function of the DL 103 is to deliver power and transport data between the ETs 107 and the ERC 101. The DL 103 thus contains three separate wires: data line 222 for upstream and downstream communications, ground connection 221, and power line 220. The three lines forming the DL 103 are connected in series between the ETs 107. A separate data link line 117 (shown in the expanded view in FIG. 2) connects the last ET 107 in the chain back to the ERC 101 to enable communication to be maintained should one of the ETs 107 fail, thereby cutting off communications to other ETs 107 further down in the chain.

C. Equipment Rack Controller (ERC)

The ERC 101 is a piece of hardware that has several functions. Each ERC 101 has a unique electronic ID. An ERC 101 can be used with a single ER 150 in one embodiment; in another embodiment, one ERC 101 can be used with four ER 150s in close proximity. Each ERC 101 manages and controls the communication between the connected ETs 107 and the software application program 126 of the central control computer 120, and also provides power to each ET 107.

Each ERC 101 is physically installed on the ER 150, and periodically transmits its unique ID and other data to the software application program 126 running on central control computer 120. During setup of the software application program 126 on the central control computer 120, the ERC 101 and its one or more associated ER 150s are logically linked in the database 127 of the central control computer 120. This logical linking ties together the physical location of the ER 150 to the ERC 101. Once installed, the ERC 101 continually polls the ET 107s that are attached to the DL 103 to confirm that the ET 107s are still connected and operating, and to retrieve unique ET 107 ID, temperature or tamper information. In addition, the ERC 101 can cause the SI 208 on a specific ET 107 to provide a sensory indication upon receiving a command from the software application program 126 provided on the central control computer 120.

D. Central Control Computer

The central control computer 120 includes a processor 122 and memory 124 for providing application software 126 executable on the processor 122 to perform the functions described herein. The memory 124 can also include the database 127 for storing ET 107, ERE 108, ERC 101 and ER 150 location and status data as described herein. The memory 124 can be one device or several separate devices. The memory 124 can take the form of a RAM, Flash, disk, CD or other computer storage medium. Similarly, the processor 122 can be one or more devices, and can be integrated together with the memory and can be a computer or other device for processing control code. The central control computer 120 further can include a display 129 and an operator interface 128, such as the keyboard shown. The central control computer 120 includes a connection to a local area network 119 to the ERC 101, as well as other ERC 101s that may be included in the system. Although the local area network 119 is shown as a wired connection, the local area network 119 can be a wireless connection.

The central control computer 120 contains and runs the software application program 126 that connects through the local area network 119 to one or more ERC 101s. The software application program 126 links to a database 127 in the central control computer 120 that stores details about the physical location of ER 150s, the assignment of a specific ERC 101 to a specific ER 150, the assignment of a specific ET 107 to a specific ERE 108, a real-time record of the status of the ET 107s that are being monitored by each ERC 101, and the temperature reading from each ET 107. In addition, the software application program 126 can provide real-time alerts if any ERE 108 monitored by an ERC 101 is moved or if the ET 107 is removed from the ERE 108. The software application program 126 also enables a data center operator(s) to remotely cause the SI 208 on a specific ET 107 to provide a sensory indication to a local technician(s). This helps a technician(s) that is standing in front of an ER 150 to positively identify the specific ERE 108.

II. Data Center Monitoring Operation

A. System Setup

Initially to setup the system, the software application program 126 is first installed on the central control computer 120 and the central control computer 120 is connected to the local area network 119. The software application program 126 is then launched and the physical location of the ER 150 is imported or entered by a user and recorded by the application program 126 into the database 127 of the central control computer 120. The user next accesses the software application program 126 to install the ERC 101 for the ER 150, and the unique ID of the ERC 101 and the ER 150 into the database 127. Once identified and on the local area network 119, the ERC 101 will begin communicating with the software application program 126 on the central control computer 120.

To physically connect the ETs 107 within an ER 150, a first segment of the DL 103 is connected to the ERC 101 on one end and, on the other end, to the first ET 107 in closest physical proximity to the ERC 101. The first connected ET 107 can now be registered with the software application program 126 of the central control computer 120 through ERC 101. This is the beginning of the serial/daisy chain of ET 107s. The next segment of the DL 103 is then connected to the second ET 107. This process of connecting the DL 103 to each ET 107, in succession, continues until all ET 107s within an ER 150 are connected. The last ET 107 in the daisy chain of the DL 103 will have a separate data link line 117 that loops back to the ERC 101. This loop-back separate data link line 117 improves the reliability of the DL 103 by providing two data paths for the ETs 107 to communicate with the ERC 101. If there is a break in the DL 103, the ETs 107 can still communicate with the ERC 101 using this alternative separate data link line 117.

The ETs 107 are connected via the DL 103, ERC 101, and local area network 119 connection to the software application program 126 running on central control computer 120. The data center operator can now access the software application program 126 of the central control computer 120 to enter the unique ID of the ETs 107 attached to the ERE 108 into the database 127 of the central control computer 120. This assignment also links the unique ID of the ET 107 to the specific ERE 108.

Once all the ETs 107 in an ER 150 are connected to the ERC 101 via the DL 103, they continually report their unique IDs and temperature information to the ERC 101. The ERC 101 sends this information to the software application program 126 running on the central control computer 120.

B. Operation after Setup

During day-to-day operation after initial setup, the software application program 126 running on the central control computer 120 continually receives data transmitted by the ERC 101 and records this information into the database 127. The received information includes the unique ID of the ERC 101, the unique ID of the ETs 107 reporting to the ERC 101, tamper status, and temperature reading of each ET 107. This real-time information, coupled with the stored information in the database 127, enables the software application program 126 running on central control computer 120 to report the real-time location of the ET 107, the associated ERE 108, and the ambient air temperature immediately around the ERE 108. If the ERC 101 stops reporting the presence of any ET 107 (for example, the DL 103 is disconnected), the software application program 126 will detect the absence of the ET 107, and a security alert will be issued to the operator(s) of the central control computer 120. Or, if someone attempts to remove the ET 107 from the ERE 108 without unplugging the DL 103, the tamper detection device 210 in the ET 107 will detect the tampering, and the software application program 126 of the central control computer 120 will detect the change in tamper status, and a security alert will be created and sent to the central control computer 120 operator(s).

The software application program 126 of the central control computer 120 can also continually monitor the ambient air temperature surrounding each ET 107, and if the temperature is outside a predetermined range, a temperature alert will be issued to the central control computer 120 operator(s). In addition, the ambient air temperature for all the ETs 107 in an ER 150 can be averaged and a grid of average rack air temperatures can be created. This information is used by an air conditioning system to eliminate hot and cold spots in the data center.

If a specific ERE 108 malfunctions or is having some sort of problem, a remote data center operator(s) can direct a local data center technician(s) to the ER 150, whereupon the remote operator(s) of central control computer 120 can access the software application program 126 of central control computer 120 and issue a command to the SI 208 on the ET 107 attached to the specific ERE 108, and thus, positively identify the problem equipment for the local technician(s).

Although the present invention has been described above with particularity, this was merely to teach one of ordinary skill in the art how to make and use the invention. Many additional modifications will fall within the scope of the invention, as that scope is defined by the following claims.

What is claimed:

1. A system for locating equipment in racks comprising: electronic identification (ID) tags each having a unique, reportable ID; equipment in a rack physically connected to electronic ID tag(s); at least one rack controller with a unique electronic ID connected by physical wire to at least one electronic ID tag; a database comprising data identifying: a physical location of at least one rack; location relationships between the at least one rack controller and the at least one rack; and location relationships between the equipment and the physically connected electronic ID tags;

said electronic ID tags connecting to the rack controller through a rigid physical data link that conforms to the size of the rack, is affixed to the rack, rack post, or rack door, and has fixed connection points for ID Tags, said rack controller determines where on the data link a given tag is connected, and reports the position on the rigid data link of a given electronic ID tag, or said rack controller determines where on the data link a given tag is connected, and reports to a central control computer the position on the rigid data link of a given electronic ID tag, and said central control computer collects information and determines a location of a given electronic ID tag.

2. The system of claim 1, at least one of each of said electronic ID tag connection points on the rigid data link includes a sensory indicator.

3. The system of claim 2, said sensory indicator is a light emitting diode (LED).

4. The system of claim 2, said central control computer being connected to said sensory indicator of said connection point on the data link to provide an activating signal.

5. The system of claim 2, said central control computer being connected to said sensory indicator of said connection point on the date data link to provide a deactivating signal.

6. The system of claim 1, at least one of each of said fixed connection points for ID Tags connected to a temperature monitor that measures ambient air temperature to provide a reported temperature.

7. The system of claim 6, said reported temperature being sent to the central control computer.

8. The system of claim 7; said the central control computer sends an alert when the reported temperature is above or below a predetermined range.

9. The system of claim 1, said at least one of said electronic ID tags including a tamper detection device, said electronic ID tag providing a report with tamper data enabling an alert to be provided to an operator.

* * * * *